June 20, 1939. S. RUPPEL Re. 21,125

SWITCH

Original Filed Aug. 8, 1934 2 Sheets-Sheet 1

Inventor:
Sigwart Ruppel,
by Harry E. Dunham
His Attorney.

June 20, 1939. S. RUPPEL Re. 21,125

SWITCH

Original Filed Aug. 8, 1934 2 Sheets-Sheet 2

Inventor:
Sigwart Ruppel,
by Harry E. Dunham
His Attorney.

UNITED STATES PATENT OFFICE 21,125

SWITCH

Sigwart Ruppel, deceased, late of Berlin, Germany, by Frida Strauss, Milan, Italy, heir Original No. 2,055,312, dated September 22, 1936, Serial No. 738,974, August 8, 1934. Application for reissue August 16, 1938, Serial No. 225,245. In Germany August 19, 1933

13 Claims. (Cl. 200—148)

This invention relates to electric switches and more particularly to pressure gas switches which must be adapted for interrupting high loads as well as small loads. According to this invention there are provided different conditions for the extinguishing of the arc corresponding to the load to be interrupted, and thereby, there is obtained a reliable interruption of the current and the best possible extinguishing of the arc under all conditions. More especially the conditions under which pressure gas is conducted to the interrupting point of the switch must be different if an overload or if the normal load is to be interrupted.

In one embodiment of this invention there is provided higher pressure of blowing at the interrupting of an overload than at the interrupting of the normal load. Also for overload operation, instead of the same gas at higher pressure, another gas having different arc interrupting characteristics can be used. It is possible also to vary the time of blowing at the interrupting point or the velocity and/or the length of the movement of the contact poles.

This invention may be used not only for switches with a plurality of points of interruption but also for switches with a single point of interruption. If the invention is used for switches with a plurality of points of interruption, one part of these points may be constructed for extinguishing the arc formed by an overload and the other for interrupting the normal load. In all cases it is necessary that the conditions under which the pressure gas is conducted to the interruption points and the conditions of the movement of the contacts differ in such a manner that the conditions for extinguishing the arc, at least at one of the interrupting points are the best ones for interrupting every load.

Another feature of this invention is, for interrupting the normal load as contrasted with an overload due to a fault such as a short circuit for example, to provide means which generate the pressure gas by the switching-out-movement of the circuit-breaker and for interrupting an overload to take the pressure gas from a vessel or from another source generating pressure gas with a higher pressure and in larger quantities. Thus, since interruptions of an overload are very infrequent in comparison to the interruptions of a normal load, large quantities of gas are spared.

The principal object of this invention is the provision of an improved electric circuit breaker of the pressure-gas or blast type which shall operate effectively and efficiently throughout the entire rated interrupting capacity range of the breaker.

Figure 1:
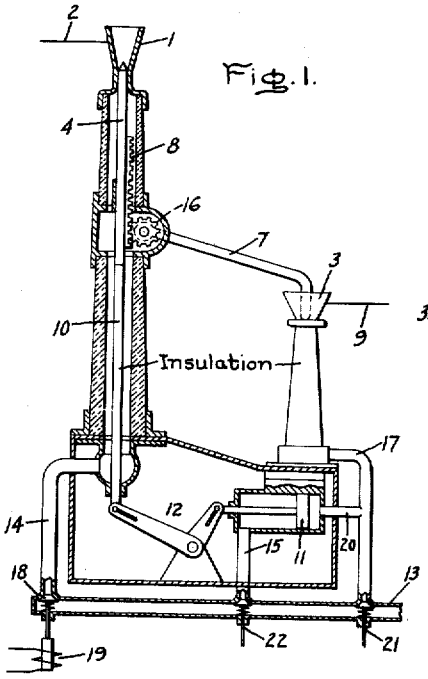

The switch shown in Figure 1 is provided with the following description referring to the accompanying drawings and the features of novelty which characterize this invention will be pointed out with particularity in the claims annexed to and forming a part of this specification.

Figure 2:
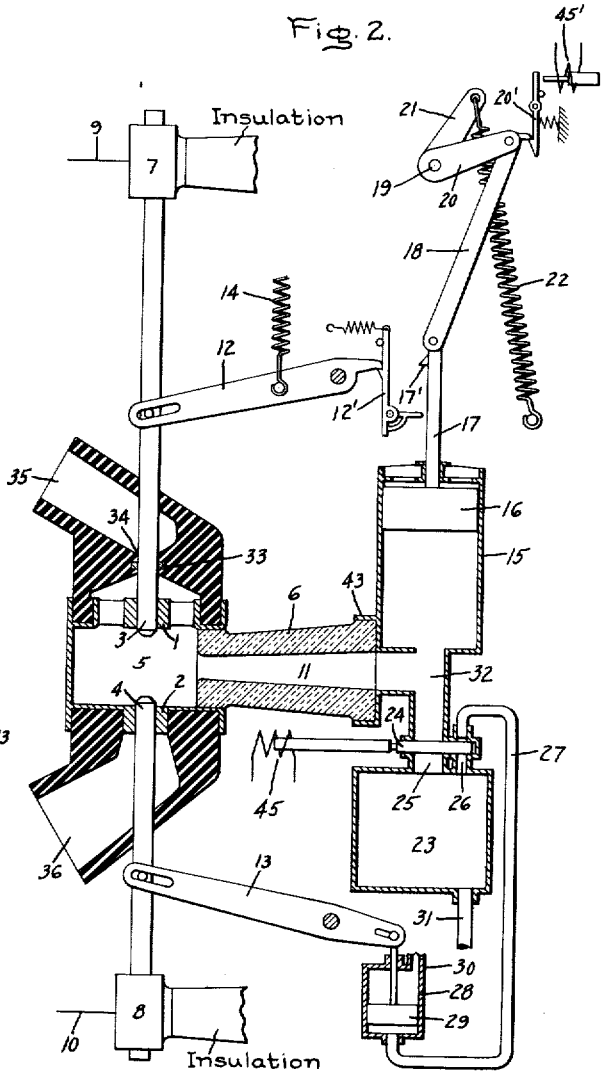
Figure 3:
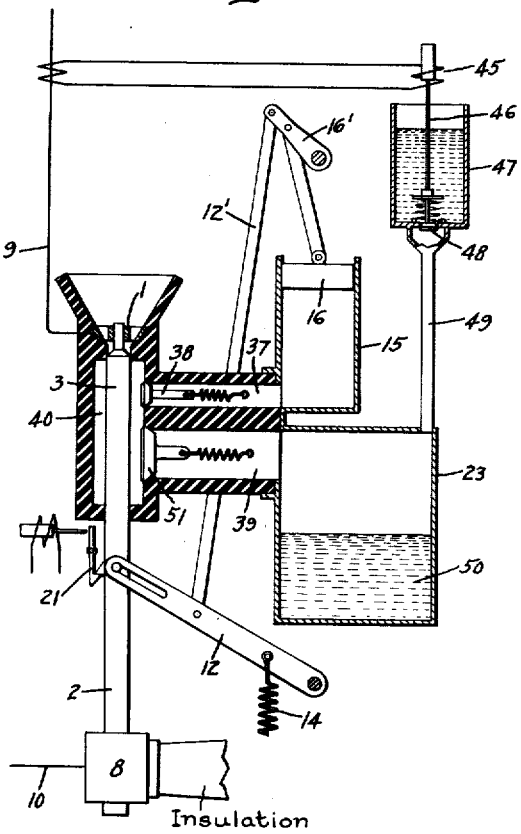
Figure 4:
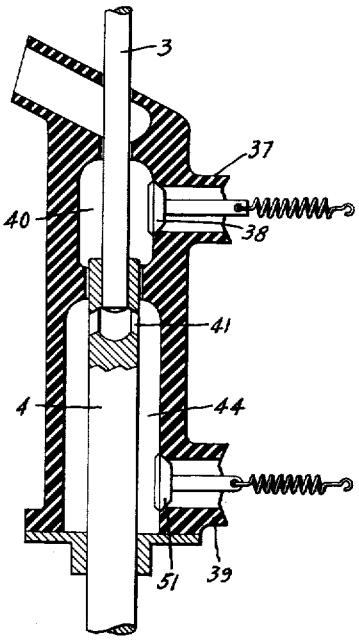

Referring to the drawings, Fig. 1 is an elevational view, partly in section of a gas blast circuit breaker embodying this invention; Figs. 2 and 3 are similar views showing other embodiments of this invention, and Fig. 4 is a partial view of a modified form of this invention.

This switch shown in Figure 1 is provided with the contact pair 1, 4 for interrupting the overload and a second contact pair 3, 7 for interrupting the normal load, both being electrically connected in series. The contacts 1 and 3 are in a well known manner formed as a nozzle and the contacts 4 and 7 as pin-contacts closing the opening of the nozzle and so preventing the escape of the pressure gas when the contacts are in closed position. 2 and 9 are the leads of the circuit controlled by the switch. The contact pin 4 is provided with a rack 8 and is connected by means of the insulating pin 10 with the switching mechanism 12 and the piston 11. The cylinder of the piston 11 is filled with the pressure gas taken from the conduit 13. The gas flows through the valve 22 and through the conduit 15 when the circuit-breaker is to be switched in and through the valve 21 and the conduit 20, when the circuit-breaker is to be switched out. The rack 8 engages the toothed wheel 16 for moving the lever contact 7.

In order to obtain different extinguishing conditions the diameter of the contact pin 4 may be different than the diameter of the contact pin 7. Also the rapidity and/or the length of the switching-out-movement may be varied. By providing a wheel 16 with a smaller number of teeth the velocity of the contact 7 disconnecting the normal load and therefore also the switching path of the contact 7 may be made greater than the velocity and the switching path of the other contact pin 4 disconnecting the overload.

The short switching distance of the over-load disconnecting points has besides better extinguishing effect the further advantage that in spite of the higher pressure of blowing necessary for interrupting the overload the loss of pressure gas is not extremely high, because the gas passage defined by the switching place may remain small. Both interrupting points being connected in series and the sparking distance in the out-position being equal to the sum of the sparking distances of both disconnecting points, the small distance of the overload disconnecting point has no disadvantages at all.

By opening the valve 22 the switch is closed by pressure gas flowing from the conduit 13 to the left side of the piston 11. Preferably the contacts 3, 7 which operate at greater speed, may be closed a little later than the contacts 1, 4 in order to obtain favourable conditions for the switching-in-movement.

By opening the valve 21 the switch is opened by the pressure gas flowing from the conduit 13 to the right side of the piston 11. At the same time the pressure gas flows through the conduit 17 to the switching chamber of the contacts 3, 7, interrupting the normal load.

If an overload is to be interrupted the overload relay 19 is energized and besides the valves 21, also the valve 18, is opened. Therefore the pressure gas flows through the conduit 17 to the normal load disconnecting point and through the conduit 14 to the overload disconnecting point. The diameter of the conduit 14 is greater than the diameter of the conduit 17 and therefore the pressure of gas at the contacts 1, 4 is greater than at the contacts 3, 7.

In order to obtain different times of blowing, the time at which the valve 21 is opened may be different from the time at which the valve 18 is opened. In the open circuit or out-position of the circuit-breaker the contacts 3, 7 form a visible disconnecting point.

Accordingly, it will be noted that although both sets of contacts 1, 4, and 3, 7 are opened in response to a circuit opening operation, the overload contacts 1, 4 are subjected to an arc interrupting gas blast only in response to actuation of the overload relay 19. At all other times the circuit is interrupted at the contacts 3, 7 by a moderate pressure gas blast.

In Figure 2 1, 3 are the contacts for interrupting the normal load and 2, 4, the contacts for interrupting the overload. The fixed contacts 1, 2 are electrically connected within a switching chamber 5 having walls of conducting material. 6 is a hollow insulator which at its one end is attached to the base plate 43 preferably earthed and at its other end supports the switching chamber 5. 7 and 8 are guiding means of conducting material for the contact pins 3 and 4. 9 and 10 are the conductors for the current to be controlled by the switch. The contact pins 3 and 4 are moved by the levers 12 and 13. 14 is a spring controlling, if released, the switching-out-movement of the contact pin 3.

The pressure gas for blowing the normal load interrupting point 1, 3 is generated in the cylinder 15 by the movement of the piston 16 and is directed through the passage 11 of the insulator 6 to the switching chamber 5. When the circuit-breaker is to be switched out the spring 22 is released which moves the piston 16 downwards by means of the crank 21, 20, the lever 18 and the piston rod 17. Generally one cylinder 15 is sufficient for the 3 poles of the circuit-breaker.

The pressure gas for the overload disconnecting points 2, 4 is contained in the vessel 23. The vessel 23 is preferably of such size that the gas content is sufficient for one interruption at the pressure of gas sufficient for the extinguishing of the arc. 31 is a conduit connecting the vessel 23 with the main vessel (not shown) of gas. 45 is an overload relay which when energized opens the slide valve 24 and thereby the openings 25 and 26. Through the opening 26 and the conduit 27 the pressure gas contained in the vessel 23 enters the cylinder 28 at the lower side of the piston 29. The piston 29 is moved upwardly and thereby the pin 4 is moved to the out-position. 30 is a conduit to close the contacts 2, 4 by pressure gas.

At the interruption of normal currents the spring 22 is suitably released, such as by the latch operating relay 45', the piston 16 is moved downwards and the gas contained in the spaces 5, 11, and 32 is compressed. As the contacts 2, 4 and the packing 33 close the chamber 5 in a gas-tight manner, no gas can escape as long as the pin 3 is in the switching-in-position. When the piston 16 is moved downwards for a certain distance the lever 12 is released by latch 12' which is disengaged by the moving mechanism at 17', the spring 14 is released and the pin 3 is moved upwards. When the pin 3 has opened the opening 34, the gas compressed in the cylinder 15 blows through the nozzle 35 of insulating material into free air and extinguishes the arc formed by the normal load between the contacts 1 and 3.

At the interruption of an overload the slide valve 24 is opened by the overload relay 45, the gas contained in the vessel 23 which generally has a considerably higher pressure than the gas contained in the cylinder 15 flows through the spaces 32, 11, and 5 and through the opening of the contact 2 and the nozzle 36 to free air. In order to prevent a back-stroke of the piston 16 it must be retained in any suitable manner. At the same time the pins 3 and 4 are moved to the out-positions and the pressure gas flowing through the two openings 2 and 34 extinguishes the arc. Preferably the opening 2 and the nozzle 36 are so dimensioned that the main part of the gas flows through the opening 2 and extinguishes the arc formed between the contacts 2 and 4 while it is still short. As the interruption point 1, 3 is connected in series with the interruption point 2, 4 and the arc at the point 2, 4 is extinguished by the pressure gas and thereby the arc at the point 1, 3, a second burning of the arc is prevented. In the out-position the pin 3 is outside of the nozzle 35 so that the separation is visible.

In the switch shown in Figure 3 the single disconnection point 1 and 3 serves to interrupt not only the normal load but also the overload. 8 is a guiding means of conducting material for the pin 2. 9 and 10 are the leads for the current. 14 is a spring which moves the pin 2 to the out-position by means of the lever 12. The interruption of normal currents is made in the same manner as in Figure 2. 16 is a piston connected to the lever 12 by a rod 12' and linkage 16', which slides in a cylinder 15 forcing pressure gas, upon a downward movement, through the insulating passage 37 and the valve 38 to the switching chamber 40.

23 is a vessel containing the pressure gas for extinguishing the arc formed by an overload. In order to prevent the gas compressed in the cylinder 15 entering through the passage 39 the vessel 23, a back-stroke-valve 51 is provided.

45 is an overload relay which, when energized, opens by means of the rod 46 the valve 48 thereby connecting the vessel 47 with the vessel 23. The fluid contained in the vessel 47, passes through the tube 49 into the vessel 23 and is mixed with the fluid 50 contained in the vessel 23. By the chemical reaction between the fluids 47 and 50 high pressure gas is generated which blows at the interruption point and extinguishes the arc formed by an overload.

Any suitable gas for interrupting arcing which may be quickly generated by mixing of fluids may be used. By way of example, a well known method of quickly generating carbon dioxide, namely that used in starting small portable fire extinguishers, comprises mixing sulphuric acid and a solution of sodium bicarbonate. This method is suitable in the present instance since carbon dioxide under pressure has previously been extensively used in this type of circuit breaker.

In the case of an arrangement such as shown by Fig. 3 where a gas other than air such, for example, as carbon dioxide having better arc-interrupting characteristics than air, is used for the overload or fault interruption, the independent blast pressure need not necessarily be greater than the normal air blast pressure. That is, a blast of carbon dioxide, for example, at a given gauge pressure has higher arc interrupting capacity than an air blast at the same pressure, as is well known in the art. The switch shown in Figure 4 is distinguished from the switch shown in Figure 3 by the feature that one disconnecting point and two extinguishing points are provided. All other details are the same as in Figures 2 and 3. Interrupting the normal load is effected by moving only the pin 3. The arc between the contacts 3 and 4 is extinguished by the gas flowing through the tube 37 to the switching chamber 40. Interrupting higher currents is effected by moving both contacts 3 and 4. The gas for extinguishing the arc enters through the tube 39 and flows through the opening 41 of the contact pin 4 to the switching chamber 40, thereby blowing and cooling the contact 4 at the inner side and at the outside. If the opening 39 does not exist the pressure gas for extinguishing the arc formed by an overload may be generated in the chamber 44 by means of the heat generated by the arc.

It should be understood that this invention is not limited to specific details of construction and arrangement thereof herein illustrated, and that changes and modifications may occur to one skilled in the art without departing from the spirit of this invention.

What is claimed is:

1. An electric circuit breaker comprising relatively movable contact structure, means operatively related to said contact structure for directing a gas blast to said contact structure upon opening thereof for normally interrupting the circuit, and means responsive to an overload in said circuit for directing a second gas blast of greater magnitude from a source different from that of said first blast to said contact structure.

2. An electric circuit breaker comprising relatively movable contact structure, means for directing a gas blast to said structure at one point in the circuit for interrupting arcing upon normal opening of said circuit, and means responsive to an overload in said circuit for directing a second gas blast at higher pressure to said contact structure at a different point in the circuit.

3. An electric circuit breaker comprising relatively movable contact structure arranged to form two breaks in series, means for directing a gas blast to one of said breaks for interrupting arcing upon normal opening of the circuit, and means responsive to an overload for directing a second gas blast of greater magnitude to the other break for interrupting arcing at that point.

4. An electric circuit breaker comprising relatively movable contact structure arranged to form two breaks in series, means for directing a gas blast to one of said breaks for extinguishing arcing upon normal opening of the circuit, means responsive to an overload for directing a gas blast of greater magnitude to the other break, and means operatively related to said contact structure for effecting a relatively higher rate of contact separation at the break for normally interrupting the circuit.

5. An electric circuit breaker comprising relatively movable contact structure, means for directing a gas blast to said structure for interrupting arcing upon normal opening of the circuit, the gas pressure therefor being generated by and in accordance with the circuit opening operation, and means responsive to an overload for directing a second gas blast of greater magnitude to said contact structure, the pressure for said second blast being from an independent source and appreciably greater than that generated for said first-named blast.

6. An electric circuit breaker comprising relatively movable contact structure arranged to form two breaks in series, means operatively related to said contact structure for effecting contact separation at one break at a greater rate than at the other break, a source of gas pressure, means including a control valve for directing a gas blast to one of said breaks, said valve likewise controlling separation of the contact structure at both of said breaks, and a second valve responsive to an overload condition for directing a gas blast of greater magnitude from said source to the other of said breaks.

7. An electric circuit breaker comprising two sets of contacts arranged to form two breaks in series, means for separating the contacts of one set for normally interrupting the circuit, a piston operatively connected to the aforesaid means for directing a gas blast to said break by and in accordance with the circuit opening operation, a separate source of gas pressure, and means including a valve responsive to an overload for directing from said source a gas blast of greater magnitude to the contacts at the other of said breaks, said gas pressure likewise effecting separation of the contacts at said last-named break independently of the other set of contacts.

8. An electric circuit breaker comprising movable contact structure, means for directing a gas blast to said structure for interrupting arcing upon normal opening of the circuit, and means responsive to an overload for directing a gas blast of greater magnitude to said contact structure, said last-named means including separately disposed fluids, said fluids being of such character as to generate gas at a high rate upon mixture of the fluids, and means for mixing said fluids in response to a circuit condition and directing the gas generated thereby to said contact structure.

9. An electric circuit breaker of the gas-blast type comprising relatively movable contact structure for opening the circuit, means for directing an arc interrupting gas blast to said contact structure in accordance with normal opening of the circuit, a substance from which gas may be generated, and means responsive solely to an overload in said circuit for causing generation of gas from said substance for use as an arc interrupting blast at said contact structure.

10. An electric circuit breaker of the gas blast type comprising relatively movable contact structure, means operatively related to said contact structure for directing a gas blast to said contact structure upon opening thereof for normally interrupting the circuit, and means responsive upon overload in said circuit for directing a second gas blast to said contact structure for interrupting the overload current, the gas of said second blast being from a source different from that of said first blast and having different arc interrupting characteristics.

11. An electric circuit breaker of the gas blast type comprising relatively movable contact structure, means for directing a gas blast to said structure for interrupting arcing upon normal opening of the circuit, the gas pressure for said blast being generated by and in accordance with the circuit-opening operation and substantially independently of the current to be interrupted, and means selectively responsive to a predetermined fault condition for directing a second gas blast to said contact structure for interrupting the fault current, the gas of said second blast being from a source independent of the source of said first gas blast and having different arc-interrupting characteristics.

12. An electric circuit breaker of the gas blast type comprising relatively movable contact structure for opening the circuit, said contact structure upon opening thereof defining a blast passage through which gas can be directed at high velocity across the arc path, means independent of the current to be interrupted for directing an arc-interrupting gas blast through said passage at said contact structure in accordance with normal opening of the circuit, a separate source of arc-extinguishing gas different from said first-named gas, and means controlled by a predetermined fault condition in said circuit for causing a gas blast from said separate source to interrupt the fault current at said blast passage.

13. An electric circuit breaker of the gas blast type comprising relatively movable contact structure for opening the circuit, said structure upon separation thereof defining a blast passage through which gas can be directed at high velocity across the arc path, means for directing an arc-interrupting blast of air through said blast passage in accordance with normal opening of the circuit, a separate source of arc-extinguishing gas different from air, and means responsive solely to an overload in said circuit for causing a gas blast from said separate source to traverse said blast passage for interrupting the overload arc.

FRIDA STRAUSS.

*Heir at Law of the Estate of Sigwart Ruppel, Deceased.*

CERTIFICATE OF CORRECTION.

Reissue No. 21,125. June 20, 1939.

FRIDA STRAUSS, HEIR OF
SIGWART RUPPEL, DECEASED.

It is hereby certified that error appears in the printed specification of the above numbered patent requiring correction as follows: Page 1, second column, line 3, strike out the words "The switch shown in Figure 1 is provided with" and insert instead This invention will be more fully set forth in; page 2, first column, line 19, for "valves" read valve; and that the said Letters Patent should be read with this correction therein that the same may conform to the record of the case in the Patent Office.

Signed and sealed this 8th day of August, A. D. 1939.

Leslie Frazer,
(Seal) Acting Commissioner of Patents.